(12) United States Patent
Pearce

(10) Patent No.: US 9,894,109 B2
(45) Date of Patent: Feb. 13, 2018

(54) LAWFUL INTERCEPT IN AN INTERNET PROTOCOL-BASED TELEPHONY SYSTEM

(71) Applicant: Cisco Technology, Inc., San Jose, CA (US)

(72) Inventor: Christopher Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 61 days.

(21) Appl. No.: 15/003,993

(22) Filed: Jan. 22, 2016

(65) Prior Publication Data

US 2017/0214721 A1 Jul. 27, 2017

(51) Int. Cl.
*H04L 29/06* (2006.01)
*H04L 12/66* (2006.01)
*H04L 12/54* (2013.01)

(52) U.S. Cl.
CPC .......... *H04L 65/1069* (2013.01); *H04L 12/56* (2013.01); *H04L 12/66* (2013.01); *H04L 63/306* (2013.01); *H04L 65/4023* (2013.01)

(58) Field of Classification Search
None
See application file for complete search history.

(56) References Cited

U.S. PATENT DOCUMENTS

| 7,209,473 B1 * | 4/2007 | Mohaban ................ H04L 29/06 370/235 |
| 7,620,389 B2 | 11/2009 | Kallio et al. |
| 8,351,579 B2 | 1/2013 | Jayaraman et al. |
| 8,743,781 B2 * | 6/2014 | Chaturvedi ........... H04L 67/104 370/328 |
| 8,948,061 B2 | 2/2015 | Sridhar |
| 2004/0202295 A1 | 10/2004 | Shen et al. |
| 2007/0121590 A1 * | 5/2007 | Turner .................... H04L 12/66 370/352 |
| 2008/0220754 A1 * | 9/2008 | Erol .................... H04M 3/2281 455/417 |
| 2010/0002880 A1 | 1/2010 | Yoon et al. |
| 2010/0086119 A1 * | 4/2010 | De Luca ............. H04M 3/2281 379/213.01 |
| 2010/0150138 A1 * | 6/2010 | Bjorsell .................. H04L 63/00 370/352 |

FOREIGN PATENT DOCUMENTS

EP 1389862 B1 11/2004

\* cited by examiner

*Primary Examiner* — Kodzovi Acolatse
(74) *Attorney, Agent, or Firm* — Edell, Shapiro & Finnan, LLC

(57) ABSTRACT

Messages sent from an initiating device to a called device to establish a telephonic communication session between the initiating device and the called device are received at a network device. One of a first network or a second network is selected to establish a first communication path of the telephonic communication session. The first network comprises an Internet Protocol network to which the initiating device and the called device are connected, and the second network comprises a public switched telephone network. Messages are sent to the called device via the one of the first network or the second network to establish the first communication path. A second communication path is established between the initiating device and the called device through another of the first network or the second network. At least a subset of data also being sent over the first communication path is sent via the second communication path.

20 Claims, 7 Drawing Sheets

LAWFUL INTERCEPT IN AN INTERNET PROTOCOL-BASED TELEPHONY SYSTEM

TECHNICAL FIELD

The present disclosure relates to telephony systems within Internet Protocol environments, and in particular, providing lawful intercept of telephony in Internet Protocol environments.

BACKGROUND

In cloud-based telephone systems, a form of Internet Protocol telephone systems, when one customer of a cloud-based service calls another customer of the service, the cloud-based service can provide features above and beyond those provided by traditional carriers; for instance, video calls. The cloud-based system can provide these services by extending the call from the caller to the called party strictly through the Internet Protocol (IP) network, bypassing the carrier network. Calls placed to called parties outside of the cloud-based system may be incapable of receiving these additional services as carrier systems may not be configured to handle the traffic formats required to provide the services and/or are incapable of meeting the bandwidth requirements for the additional services.

Lawful intercept involves obtaining communication network data pursuant to lawful authority for the purpose of analysis or evidence. Such data generally consist of signaling or network management information or, in other instances, the content of the communications. Cloud-based telephone systems may be required to provide lawful intercept services even if the calls within the cloud-based system are routed strictly through the cloud without ever passing through service provider networks.

DESCRIPTION OF EXAMPLE EMBODIMENTS

Overview

Messages sent from an initiating device to a called device to establish a telephonic communication session between the initiating device and the called device are received at a network device. Via the network device, one of a first network or a second network is selected through which to establish a first communication path of the telephonic communication session, wherein the first network comprises an Internet Protocol network to which the initiating device and the called device are connected, and wherein the second network comprises a public switched telephone network. Messages are sent via the network device to the called device via the one of the first network or the second network to establish the first communication path for the telephonic communication session between the initiating device and the called device through the one of the first network or the second network. A second communication path is established between the initiating device and the called device through another of the first network or the second network. At least a subset of data also being sent over the first communication path is sent via the second communication path.

Example Embodiments

Figure 1:
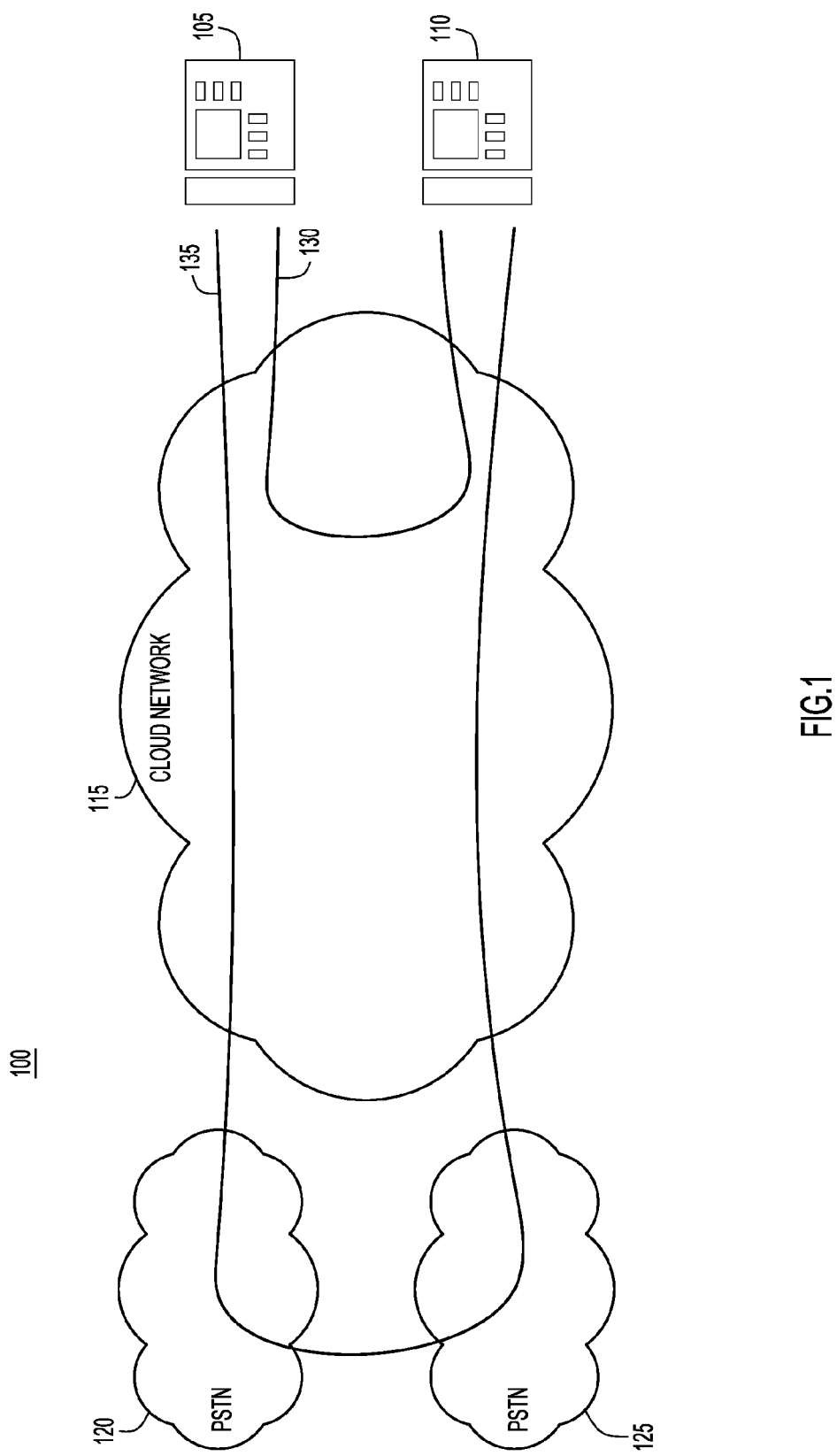
FIG. 1 illustrates a networking environment configured to provide lawful intercept in an Internet Protocol-based telephony system, according to an example embodiment.

With reference made to FIG. 1, depicted therein is a network environment 100 configured to provide legal call interception between callers connected to the same Internet Protocol (IP) network. In other words, network environment 100 is configured to provide Lawful Intercept (LI) of IP or cloud-based network calls.

According to the example of FIG. 1, initiating device 105 and called device 110 are both connected to IP network 115, which according to the present example embodiment is a cloud network. Cloud network 115 is configured to determine if a call between an initiating device and a called device "hairpins." As used herein, a call "hairpins" when the call leaves one network environment, enters a service provider for routing, and then returns to the same network environment. For example, if initiating device 105 initiates a call to called device 110, the messages used to establish the call would traverse cloud network 115, enter one or more of Public Switched Telephone Networks (PSTNs) 120 and 125, and ultimately return to cloud network 115 to connect to called device 110. If it is determined that the call "hairpins" back to cloud network 115, cloud network 115 may "short circuit" the call between initiating device 105 and called device 110, by establishing the call directly through cloud network 115 and/or directly between initiating device 105 and called device 110. By "short circuiting" the call in this way, IP-based services, such as video, call rostering, and other services, may be applied to the call even if PSTN 120 and/or PSTN 125 are not configured to provide these services.

Even though the call between initiating device 105 and called device 110 is short circuited through cloud network 115, and therefore, never enters PSTNs 120 and 125, the call may nevertheless be subject to legal requirements, such as providing LI of call data between initiating device 105 and called device 110. For example, law enforcement regulations may require that the content of communications be capturable (e.g., subject to surveillance or "tapping") by law enforcement organizations. PSTN 120 and/or PSTN 125 may be legacy systems that are already configured to provide LI of calls which route through PSTN 120 and/or PSTN 125. Cloud network 115, on the other hand, may not be configured to provide LI services, or the manner in which telephony services are handled in an IP or cloud-based network may render providing LI services directly from the IP or cloud-based network difficult. For example, the LI regulations may not simply require that law enforcement be provided access to the call data, the regulations may also require that the LI of the call be untraceable and/or undetectable by service subscribers and/or service providers.

This "untraceability" may limit or prevent logging of the LI and or require that the telephony system not provide any indication to initiating device 105 or called device 110 that it is currently subject to LI surveillance. Meeting these LI requirements within an IP or cloud-based network may be difficult based on the manner in which telephonic communications are provided in an IP or cloud-based network. For example, if a call were allowed to "short circuit" through cloud network 115 when not subject to LI, but would route through PSTN 120 and/or PSTN 125 when subject to LI in order to leverage the LI systems already in place in PSTN 120 and/or PSTN 125, the loss of IP-based services, such as video, would serve as an impermissible indication to the users of initiating device 105 or called device 110 that the LI was taking place.

In order to leverage the LI systems of PSTN 120 and/or PSTN 125, while providing IP-based telephony services that maintain the untraceability of LI surveillance, the techniques and devices described herein provide for a "double hairpin" as illustrated through first communication path (e.g., call connection) 130 and second communication path (e.g., call connection) 135. First communication path or call connection 130 provides a communication path for data of a telephone call between initiating device 105 and called device 110 that hairpins through cloud network 115. First call connection 130 may provide IP-based telephony services between initiating device 105 and called device 110. Second communication path 135 exits cloud network 115, and communicates data associated with first call connection 130 through PSTN 120 and/or PSTN 125 to leverage the LI systems within these networks, and hairpins back through cloud network 115. According to some examples, second communication path 135 is a second call between initiating device 105 and called device 110. This second call may be a "shadow" call connection, as will be described in greater detail below. According to other examples, second communication path 135 may not be a call between initiating device 105 and called device 110. Instead, second communication path 135 may be a call between intermediate devices within the communication path of first call connection 130. According to other examples, second communication path 135 need not be a call between any two particular devices, so long as data from first call connection 130 is transmitted through PSTN 120 and/or PSTN 125 in order to leverage the LI systems in PSTN 120 and/or PSTN 125. By providing the two communication paths in parallel, IP-based services can be provided through cloud network 115, LI can be provided through PSTN 120 and/or PSTN 125, and LI untraceability requirements may be maintained. Detailed examples of how first call connection 130 and second call connection 135 may be established and maintained are described in detail with reference to FIGS. 2-6.

Figure 2:
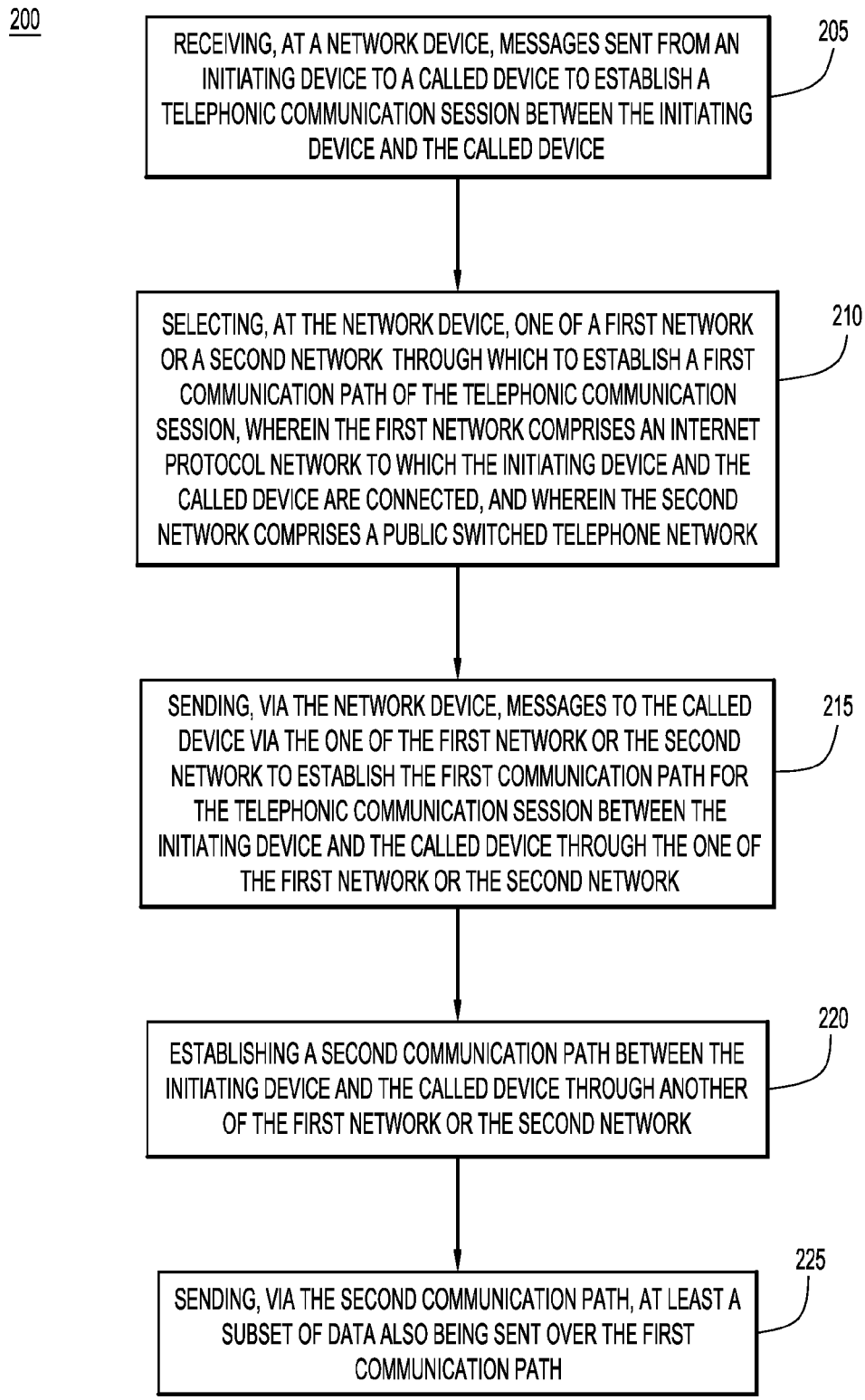
FIG. 2 is a flowchart illustrating a method of providing lawful intercept in an Internet Protocol-based telephony system, according to an example embodiment.

With reference now made to FIG. 2, depicted therein is a flowchart 200 illustrating a process for providing LI while maintaining IP-based telephony services. The process begins in operation 205 where a message that has been sent from an initiating device to a called device is received at a network device. The network device may be a device within an IP or cloud based network that is configured to provide IP-telephony services within the IP or cloud-based network. For example, the network device may be a line edge device, i.e., a device at the edge of the IP or cloud-based network that faces initiating or called devices, a call agent device, and/or a cloud edge device, i.e., a device at the edge of the IP or cloud-based network that faces a PSTN. The purpose of the message received at the network device is to establish a telephonic communication session between the initiating device and the called device.

In operation 210, one of a first network and a second network is selected through which a first communication path between the initiating device and the called device will be established. The selection of the first network or the second network is performed by the network device. The first network may be an IP network, such as cloud network 115 of FIG. 1, while the second network may be a PSTN, such as PSTN 120 and/or PSTN 125 of FIG. 1. Either the first network or the second network may be selected in operation 210.

In operation 215, messages are sent to the called device from the network device over the network that was selected in operation 210 in order to establish the first communication path between the initiating device and the called device. The examples of the types of messages sent and received in operations 205 and 215 will be described in greater detail with reference to FIGS. 3-6 below.

In operation 220, a second communication path between the initiating device and the called device is established through another of the first network and the second network. In other words, if the first communication path is established through the first network (e.g., an IP or cloud-based network), the second communication path will be established through the second network (e.g., the PSTN network). On the other hand, if the first communication path is established through the second network (e.g., the PSTN network), the second communication path will be established through the first network (e.g., the IP or cloud-based network).

In operation 225, at least a subset of the data that is sent over the first communication path is also sent via the second communication path. For example, if the first communication path remains within the IP or cloud-based network, packets may be sent over the first communication path that provide both audio and additional telephony services, such as video and/or call roster information. At least the audio (e.g., a subset of the data sent over the first communication path) may also be sent over the second communication path (i.e., the path through the PSTN network). Because the subset of data is sent through the second communication path, this data may be subject to LI through the LI services provided by the PSTN network. Furthermore, if the second communication path is configured to support IP-based telephony services, the data sent over the second communication path may fully replicate the data sent over the first communication path. Additionally, because at least a subset of the data is sent over both the first communication path and the second communication path, one of the two communication paths may be subject to LI without providing any indication to the user. For example, the data sent over the communication path through the PSTN may be subject to LI, while the data sent over the IP or cloud based network is communicated without alteration. Finally, if the two communication paths are always established regardless of whether LI is taking place, when LI is performed on one of the two communication paths, the presence of the two communication paths does not serve as an indication to a user that they are subject to LI. Accordingly, by establishing communication paths as illustrated in the example method of FIG. 2, LI can be enabled for IP or cloud-based telephony in a way that conforms with the untraceability requirements for LI.

Figure 3:
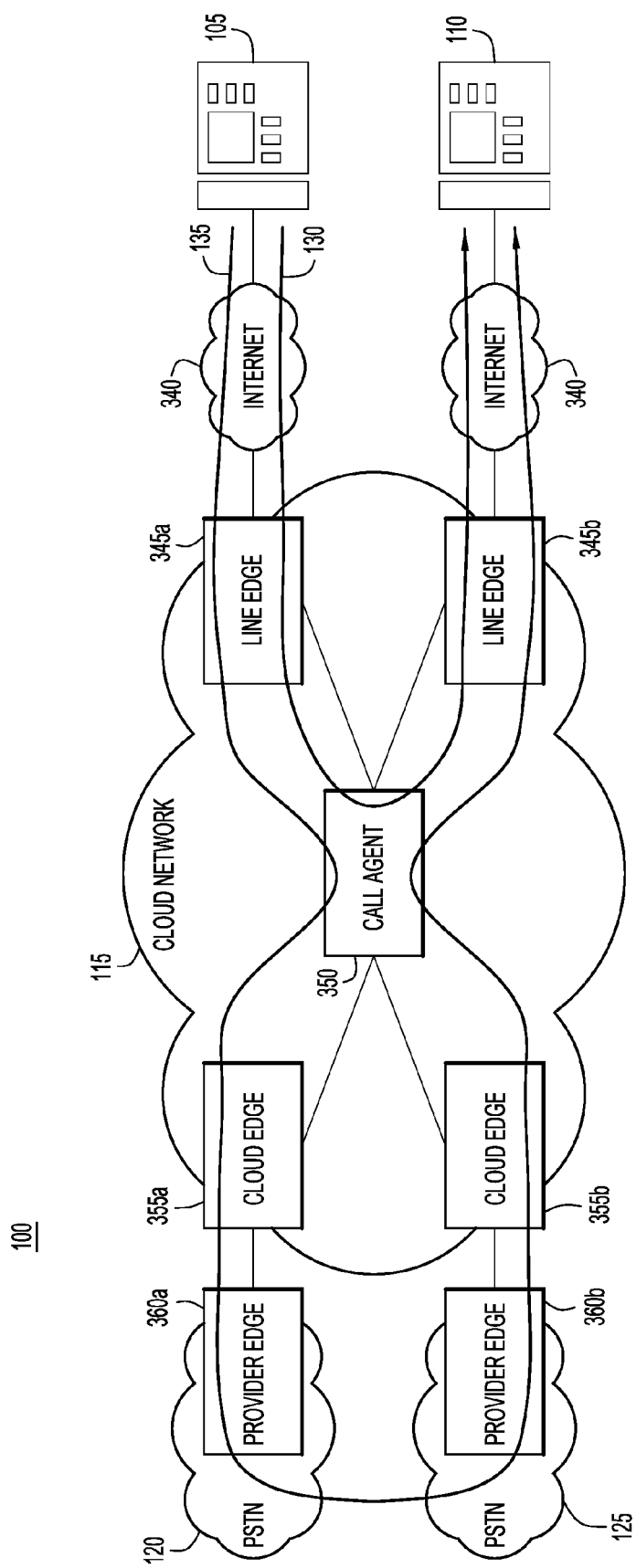
FIG. 3 is an illustration of a first process for providing lawful intercept in an Internet Protocol-based telephony system through use of a shadow call traversing a Public Switched Telephone Network, according to an example embodiment.

With reference now made to FIG. 3, depicted therein is an example embodiment of the techniques disclosed herein for providing LI in conjunction with IP-based telephony services. A user of device 105 dials a number associated with device 110, making device 105 an initiating device and device 110 a called device. Initiating device 105 generates, for example, a Session Initiation Protocol (SIP) INVITE message which may comprise one or more IP packets. This INVITE message is routed into cloud network 115, possibly through the Internet 340. The INVITE message routes through line edge device 345 and into the call control core of cloud network 115. According to the example of FIG. 3, the call control core for cloud based network 115 is embodied in call agent device 350. Call agent device 350 recognizes that initiating device 105 and called device 110 are both connected to cloud network 115 (e.g., the users of initiating device 105 and called device 110 are both subscribers to the IP-based telephony services provided by cloud network 115). Accordingly, call agent 350 "hairpins" the INVITE message within-cloud network 115 towards called device 110. Embedded within the INVITE message is a session identifier (ID), such as a session ID as described in the Internet Engineering Task Force (IETF) draft entitled "End-to-End Session Identification in IP-Based Multimedia Communication Networks." The initiating device 105 and the called device 110 establish a first communication path through cloud network 115 through, for example, a series of IP messages exchanged between the devices. Accordingly, the first communication path 130 is established through cloud network 115. The first communication path 130 of the present example is a call connection between initiating device 105 and called device 110.

Once the call is established, call agent 350 begins the process of establishing the second communication path 135 through PSTN 120 and/or PSTN 125. Specifically, call agent 350 sends an out-of-dialog SIP REFER message to the initiating device 105. REFER messages are often used to initiate transfers, and serve as an indication for a device that receives the REFER message to initiate new call connection 135 with a device indicated in the REFER message. The REFER message sent from call agent 350 to initiating device 105 directs initiating device 105 to initiate call connection 135 with called device 110, but the REFER message is further configured such that when the call is initiated by initiating device 105, the call connection 135 serves as a "shadow" companion call connection to the call already established through cloud network 115 between initiating device 105 and called device 110. Specifically, the REFER message sent by call agent 350 specifies that the subsequent INVITE message sent from the initiating device 105 be marked as a "shadow" call connection with the same session ID as the already established call connection 130. A call is considered a "shadow" call when devices associated with the call do not project, render or display any data associated with the call.

In response to the REFER message sent by call agent 350, initiating device 105 sends the "shadow" INVITE message. The session ID and "shadow" indication in the new INVITE message alert call agent 350 that this INVITE should be used to establish the second communication path 135 (e.g., a "shadow" call) for the call connection 130 already established between initiating device 105 and called device 110. Therefore, when call agent 350 receives the "shadow" INVITE message, it routes the call through the network not selected for the previously established call.

The shadow INVITE routes through one or more of PSTN 120 and/or PSTN 125, hairpins back into cloud network 115, and ultimately arrives at called device 110. Specifically, the new INVITE is routed to called device 110 through one or more of PSTN 120 and/or PSTN 125 via cloud network edge 355a, through PSTN 120 via provider edge 360a, through PSTN 125 via provider edge 360b, and back to cloud network 115 via cloud edge 355b. Based upon the session ID that matches the already established call connection 130 between the initiating device 105 and the called device 110 and the shadow indication in the shadow INVITE message, called device 110 auto answers the call, but does not render information about the call on called device 110. Called device 110 negotiates media to be transferred over the shadow call connection 135, and this media may be different from the media being transferred or to be transferred over the already established call connection 130. For example, the media (i.e., data) transferred over the already established call connection 130 may include both audio and video, while the shadow call connection 135 may be limited to media that PSTN 120 and/or PSTN 125 is configured to transmit (e.g., only audio).

Furthermore, the shadow call connection 135 may be configured with security that differs from that of the previously established call. For example, the call connection 130 hairpinned through cloud network 115 may be configured with Data Transport Layer Security (DTLS) through the Secure Real-time Transport Protocol (SRTP), while the shadow call connection 135 being routed through PSTN 120 and/or PSTN 125 may be configured with Real-time Transport Protocol (RTP) security or no security at all, allowing law enforcement to directly access the data. When RTP is used with the shadow call connection 135, law enforcement may need to subpoena encryption keys from the PSTN service providers. Finally, when the call connection 130 through cloud-based network 115 is terminated, the call through PSTN 120 and/or PSTN 125 would be simultaneously terminated by initiating device 105 and called device 110.

The process illustrated in FIG. 3 may be modified such that the shadow call connection 135 through PSTN 120 and/or PSTN 125 is established first. Specifically, call agent 350 may route the initial INVITE message sent from initiating device 105 through PSTN 120 and/or PSTN 125 to establish call connection 135 prior to establishing call connection 130. The INVITE message received by call agent 350 in response to the REFER message may then be routed to called device 110 via cloud network 115 to establish call connection 130. In order to ensure that call connection 135 remains a shadow call, call agent 350 may modify the initially sent INVITE message such that when the call through PSTN 120 and/or PSTN 125 is established, it is established as a shadow call, or call agent 350 may modify call connection 135 to serve as a shadow call after call connection 130 is established.

Figure 4:
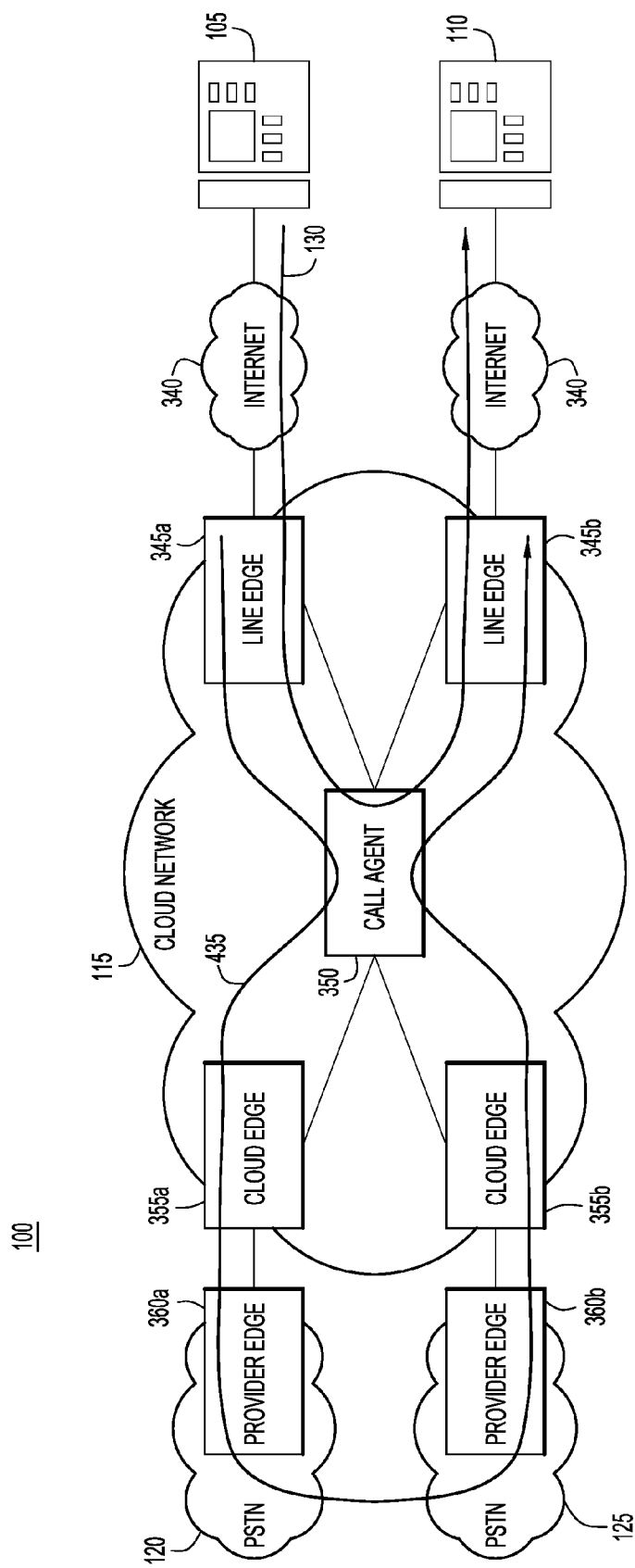
FIG. 4 is an illustration of a second process for providing lawful intercept in an Internet Protocol-based telephony system through use of a shadow call traversing a Public Switched Telephone Network, according to an example embodiment.

With reference now made to FIG. 4, depicted therein is a modification of the process illustrated in FIG. 3 that prevents the second communication path from communicating directly with initiating device 105 and/or called device 110.

The process of FIG. 4 begins similar to that of FIG. 3, and initial call connection 130 is established according to the same process described above. The process of FIG. 4 differs from that of FIG. 3 in the recipient of the REFER message sent by call agent 350 that is used to initiate the shadow call connection, in this case, shadow call connection 435. A REFER message may be sent to any device within the media path of initial call connection 130. Therefore, in the example of FIG. 4, call agent 350 sends a REFER message to line edge 345a with an indication to create a call connection with line edge 345b that shares the same session ID as call connection 130. In response to this REFER message, line edge 345a sends a shadow INVITE message to line edge 345b that call agent 350 routes through PSTN 120 and/or PSTN 125. Line edge 345b receives the shadow INVITE message, and call connection 435 is established between line edge 345a and line edge 345b. Because call connection 435 shares the same session ID as call connection 130, line edge 345a and 345b understand that they are responsible for the shadow call connection, and therefore, line edges 345a and 345b may limit the data sent over call connection 435 to the subset of data that PSTN 120 and/or PSTN 125 are configured to transmit.

Accordingly, call connection 435 is not a call connection between initiating device 105 and called device 110, but it is nevertheless a communication path between initiating device 105 and called device 110, as data communicated between initiating device 105 and called device 110 is transmitting over shadow call connection 435. Furthermore, the process illustrated in FIG. 4 may utilize other devices within the media path of the initial call, call connection 130, including Traversal Using Relay Network Address Translation (TURN) relays.

Figure 5:
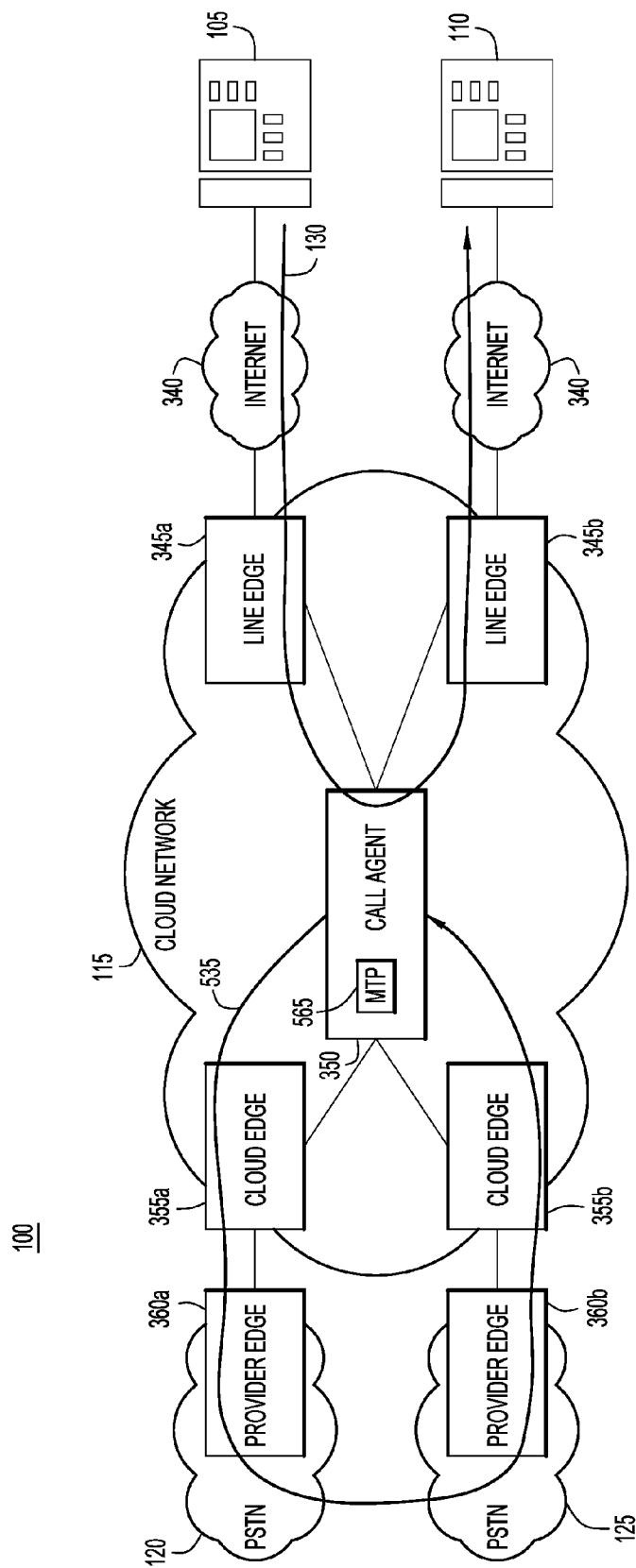
FIG. 5 is an illustration of a third process for providing lawful intercept in an Internet Protocol-based telephony system through use of a shadow call traversing a Public Switched Telephone Network, according to an example embodiment.

With reference now made to FIG. 5, depicted therein is another alternative to the process of FIG. 3, in which call agent 350 inserts a Media Termination Point (MTP) 565 into the media path of the initial call connection 130. MTP 565 is a device that may serve as a relay point within a communication path, and can provide supplementary services, including call holding, call transferring, call parking, and conferencing that may not be available at endpoint devices, like IP handsets. According to the example of FIG. 5, MTP 565 is established at call agent 350. With MTP 565 serving as an endpoint, the REFER message sent by call agent 350 to establish the shadow call connection may be sent to MTP 565 to establish a call connection with itself that is routed through PSTN 120 and/or PSTN 125 that shares a session ID with that of call connection 130. Accordingly, MTP 565 is responsible for sending the subset of data received at call agent 350 as part of call connection 130 through PSTN 120 and/or PSTN 125.

Figure 6:
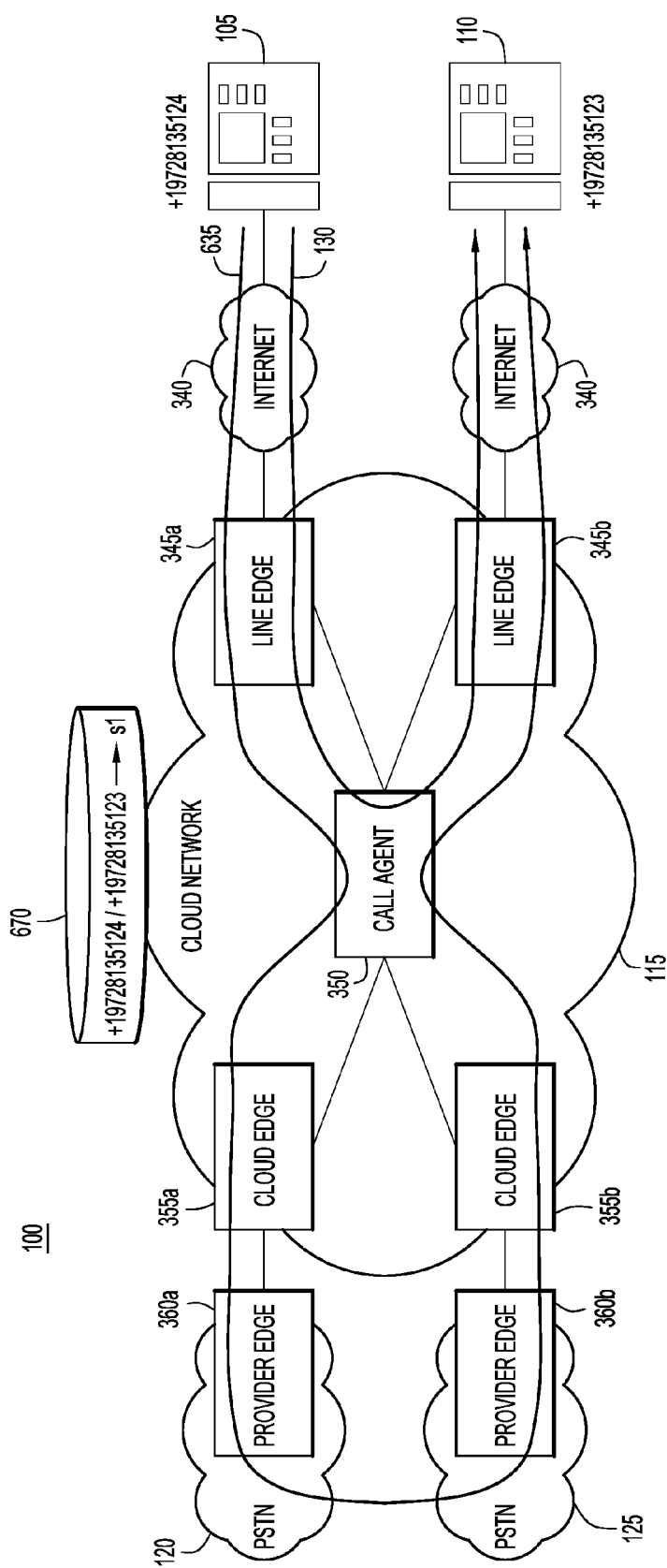
FIG. 6 is an illustration of a fourth process for providing lawful intercept in an Internet Protocol-based telephony system through use of a shadow call traversing a Public Switched Telephone Network and a database storing call identification information, according to an example embodiment.

With reference now made to FIG. 6, depicted therein is another alternative to the process of FIG. 3 for environments in which PSTN 120 and/or PSTN 125 are not configured to transmit a session ID and/or are not configured to provide for shadow calls. In order to compensate for the inability of PSTN 120 and PSTN 125 to transmit session IDs and shadow call indications, call agent 350 (or another device within cloud network 115 that can be accessed by call agent 350) maintains a database 670 that stores identifying information for the call between initiating device 105 and called device 110. Database 670 may be embodied as a key value store, a relational database, or some of other form of data store, so long as it is capable of storing call identification information. The call identification information may be initiating entity and called entity identity information (e.g., the phone numbers associated with initiating device 105 and called device 110, respectively). The call identification information may also include other information that can identify the call path between initiating device 105 and called device 110, such as Uniform Resource Identifier (URI) parameters, caller and called user names, and other identifying information. The information stored in database 670 may also include the session ID.

The process of FIG. 6 may establish initial call connection 130 in a manner similar to that of FIG. 3, above, but adds the step of storing call identifying information in database 670 during the establishment of call connection 130. The call identifying information may include the phone numbers associated with initiating device 105 and called device 110, as well as a session ID associated with call connection 130. Second call connection 635 is also established in the same manner as described above with reference to FIG. 3, but with the modification that a session ID will not be included in the messages sent through PSTN 120 and/or PSTN 125 that establish call connection 635.

When messages are received at call agent 350 from PSTN 120 and/or PSTN 125, call agent 350 may access database 670 to determine if the parameters of the received messages match the identification information stored in database 670 during the establishment of call connection 130. If the received messages match a call stored in database 670, call agent 350 may alter the messages such that when they are received at initiating device 105 and/or called device 110, they are configured to be treated as messages of a shadow call. For example, call agent 350 may reformat the messages such that they do include the session ID associated with call connection 130 and/or include a shadow call indicator. Database 670 may also be implemented for processes like those illustrated in FIGS. 4 and 5 when the processes of FIGS. 4 and 5 are implemented in conjunction with PSTNs that do not support session IDs and/or shadow call indications.

Figure 7:
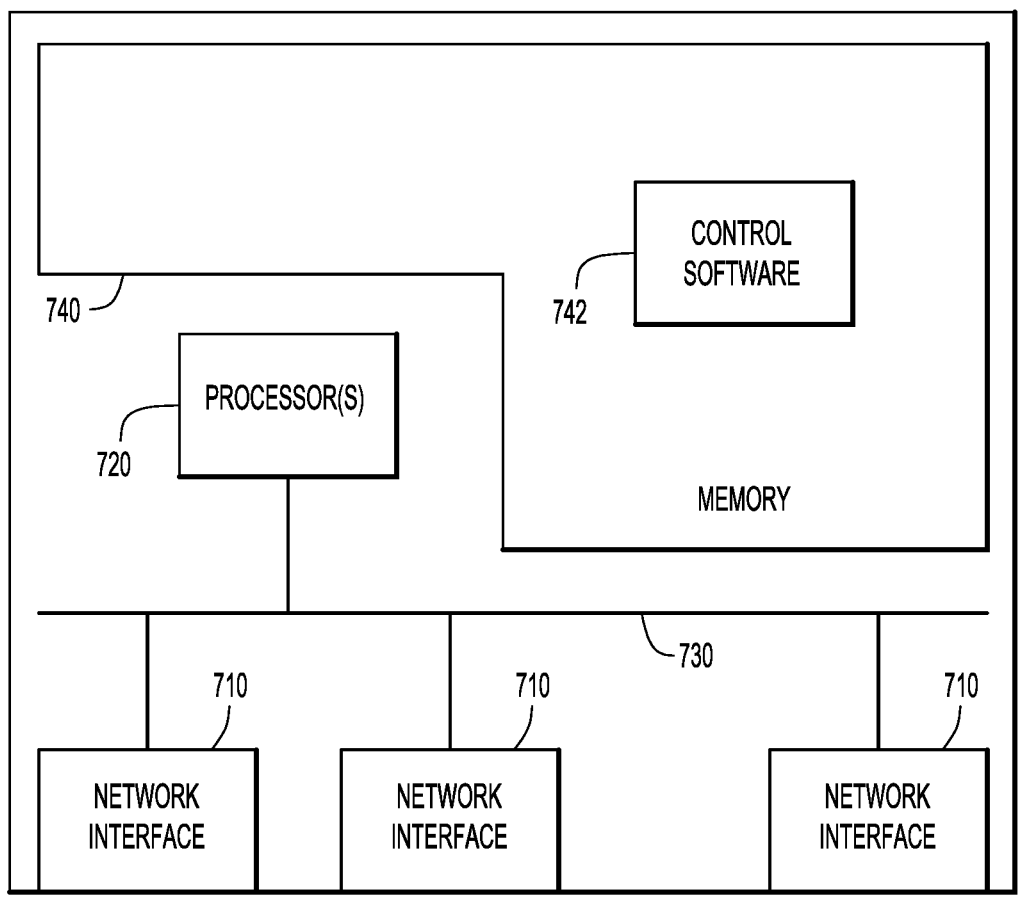
FIG. 7 is a block diagram of a device configured to provide lawful intercept in an Internet Protocol-based telephony system, according to an example embodiment.

With reference to FIG. 7, device 700 may be a network device configured to perform the techniques described herein. For example, device 700 may be embodied as one or more of an initiating device, a called device, a call agent, a line edge device, a cloud edge device, a provider edge device, a TURN relay, an MTP device, or a standalone database device. Device 700 includes network interfaces (e.g., network ports) 710 which may be used to receive and send packets over a network. The network interfaces 710 may be included as part of a network interface unit (e.g., a network interface card). Accordingly, network interfaces 710 may be embodied as wired interfaces, wireless interfaces, optical interfaces, electrical interfaces, or a combination thereof. One or more processors 720 are provided to coordinate and control device 700. The processor 720 is, for example, one or more microprocessors or microcontrollers, and it communicates with the network interfaces 710 via bus 730. Memory 740 stores software instructions 742 which may be executed by the processor 720. For example, control software 742 for device 700 includes instructions for performing the techniques described above with reference to FIGS. 1-6. In other words, memory 740 includes instructions for device 700 to carry out the operations described above in connection with FIGS. 1-6. Memory 740 may also store database 670 as discussed above with reference to FIG. 6. This data may be stored in a database in memory 740, and control software 742 may allow the processor 720 to access the data.

Memory 740 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 740 may be or include one or more tangible (non-transitory) computer readable storage media (e.g., a memory device) encoded with software comprising computer executable instructions. When the instructions of the control software 742 are executed (by the processor 720), the processor is operable to perform the operations described herein in connection with FIGS. 1-6.

In summary, described herein are methods that include receiving, at a network device, messages sent from an initiating device to a called device to establish a telephonic communication session between the initiating device and the called device. Via the network device, one of a first network or a second network is selected through which to establish a first communication path of the telephonic communication session, wherein the first network comprises an Internet Protocol network to which the initiating device and the called device are connected, and wherein the second network comprises a public switched telephone network. Messages are sent via the network device to the called device via the one of the first network or the second network to establish the first communication path for the telephonic communication session between the initiating device and the called device through the one of the first network or the second network. A second communication path is established between the initiating device and the called device through another of the first network or the second network. At least a subset of data also being sent over the first communication path is sent via the second communication path.

In another form, an apparatus is provided that includes a processor and a network interface unit. The processor is configured to receive, via the network interface unit, messages from an initiating device to a called device to establish a telephonic communication session between the initiating device and the called device. The processor selects one of a first network or a second network through which to establish a first communication path of the telephonic communication session, wherein the first network comprises an Internet Protocol network to which the initiating device and the called device are connected, and wherein the second network comprises a public switched telephone network. The processor sends, via the network interface unit, messages to the called device via the one of the first network or the second network to establish the first communication path for the telephonic communication session between the initiating device and the called device through the one of the first network or the second network. The processor establishes a second communication path between the initiating device and the called device through another of the first network or the second network. The processor sends at least a subset of data also being sent over the first communication path via the second communication path.

Additionally, described herein are one or more tangible, non-transitory computer readable storage media encoded with software comprising computer executable instructions. The software, when executed, is configured to receive messages sent from an initiating device to a called device to establish a telephonic communication session between the initiating device and the called device. The instructions cause the selection of one of a first network or a second network through which to establish a first communication path of the telephonic communication session, wherein the first network comprises an Internet Protocol network to which the initiating device and the called device are connected, and wherein the second network comprises a public switched telephone network. The instructions causes messages to be sent to the called device via the one of the first network or the second network to establish the first communication path for the telephonic communication session between the initiating device and the called device through the one of the first network or the second network. The instructions cause a second communication path to be established between the initiating device and the called device through another of the first network or the second network. Finally, the instructions cause at least a subset of data being sent over the first communication path to also be sent via the second communication path.

By implementing the methods and processes described herein, or through the use of device as described herein, telephony systems using IP and/or cloud-based networks may be provided that utilize a double-hairpinned call to provide rich features over a primary call while using existing carrier LI infrastructure to meet legal requirements. Accordingly, LI may be provided for without having to implement LI within the IP and/or cloud-based environment, thereby providing easier LI implementations. Furthermore, the techniques provided herein preserve cloud-service customer privacy as the data within the IP and/or cloud-based environment may remain encrypted and private, while meeting LI requirements.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
    receiving, at a network device, messages sent from an initiating device to a called device to establish a telephonic communication session between the initiating device and the called device;
    establishing a first telephonic communication session via a first communication path through a first network, and establishing a second telephonic communication session via a second communication path through a second network, wherein the first network comprises an Internet Protocol network to which the initiating device and the called device are connected, wherein the second network comprises a public switched telephone network configured to provided lawful intercept of data being sent over the second communication path, and wherein the second communication path exits the first network to traverse the second network and returns to the first network;
    sending, via the network device, data to the called device via the first network over the first communication path; and
    sending, via the second network over the second communication path, a copy of the data being sent over the first communication path.
2. The method of claim 1, wherein establishing the first telephonic communication session via the first communication path comprises sending messages to the called device including a telephonic communication session identifier; and
    wherein establishing the second telephonic communication session via the second communication path comprises sending messages to the called device including the telephonic communication session identifier.

3. The method of claim 1, further comprising:
storing, in the network device, information identifying the second telephonic communication session;
receiving from the public switched telephone network messages for the second telephonic communication session;
identifying the messages received from the public switched telephone network as part of the second telephonic communication session based on the stored information; and
forwarding the messages as part of the second telephonic communication session through the Internet Protocol network, wherein the information identifying the second telephonic communication session is included in the messages that are forwarded.

4. The method of claim 1, wherein the network device comprises a call agent device of the Internet Protocol network.

5. The method of claim 1, wherein the first telephonic communication session comprises a first telephone call and the second telephonic communication session comprises a second telephone call; and
wherein the first telephone call and the second telephone call share a common session identifier.

6. The method of claim 1, wherein second telephonic communication session comprises a telephone call between a first network connected device within the Internet Protocol network and a second network connected device within the Internet Protocol network, and
wherein the first network connected device and the second network connected device are not the initiating device or the called device.

7. The method of claim 1, wherein the second telephonic communication session comprises a telephone call between the initiating device and the called device, and wherein data transmitted via the telephone call is not rendered or displayed by the initiating device or the called device.

8. An apparatus comprising:
a network interface unit; and
a processor, where the processor is configured to:
receive, via the network interface unit, messages sent from an initiating device to a called device to establish a telephonic communication session between the initiating device and the called device;
establish a first telephonic communication session via a first communication path through a first network, and establish a second telephonic communication session via a second communication path through a second network, wherein the first network comprises an Internet Protocol network to which the initiating device and the called device are connected, wherein the second network comprises a public switched telephone network configured to provided lawful intercept of data being sent over the second communication path, and wherein the second communication path exits the first network to traverse the second network and returns to the first network;
send, via network interface unit, data to the called device via the first network over the first communication path; and
send, via the network interface unit a copy of the data being sent over the first communication path via the second network over the second communication path.

9. The apparatus of claim 8, wherein the processor is configured to:
establish the first telephonic communication session via the first communication path by sending the messages to the called device including a telephonic communication session identifier; and
establish the second telephonic communication session via the second communication path by sending messages to the called device via the second network including the telephonic communication session identifier.

10. The apparatus of claim 8, further comprising a memory, wherein the processor is further configured to:
store in the memory information identifying the second telephonic communication session;
receive, via the network interface unit from the public switched telephone network, messages for the second telephonic communication session;
identify the messages received from the public switched telephone network as part of the second telephonic communication session based on the information stored in the memory; and
forward, via the network interface unit, the messages as part of the second telephonic communication session through the Internet Protocol network, wherein the information identifying the second telephonic communication session is included in the messages that are forwarded.

11. The apparatus of claim 8, wherein the first telephonic communication session comprises a first telephone call and the second communication session comprises a second telephone call; and
wherein the first telephone call and the second telephone call share a common session identifier.

12. The apparatus of claim 8, wherein second telephonic communication session comprises a telephone call between a first network connected device within the Internet Protocol network and a second network connected device within the Internet Protocol network, and
wherein the first network connected device and the second network connected device are not the initiating device or the called device.

13. The apparatus of claim 8, wherein the second telephonic communication session comprises a telephone call between the initiating device and the called device, and wherein data transmitted via the telephone call is not rendered or displayed by the initiating device or the called device.

14. The apparatus of claim 8, wherein the apparatus comprises a call agent device of the Internet Protocol network.

15. One or more tangible non-transitory computer readable storage media encoded with software comprising computer executable instructions and when the software is executed operable to:
receive, via a network interface, messages sent from an initiating device to a called device to establish a telephonic communication session between the initiating device and the called device;
establish a first telephonic communication session via a first communication path through a first network, and establish a second telephonic communication session via a second communication path through a second network, wherein the first network comprises an Internet Protocol network to which the initiating device and the called device are connected, wherein the second network comprises a public switched telephone network configured to provided lawful intercept of data being sent over the second communication path, and wherein the second communication path exits the first network to traverse the second network and returns to the first network;

send, via the network interface, data the called device via the first network; and send, via the network interface, a copy of the data being sent over the first communication path via the second network over the second communication path.

16. The computer readable storage media of claim 15, further comprising instructions operable to:

establish the first telephonic communication session via the first communication path by sending the messages to the called device including a telephonic communication session identifier; and establish the second telephonic communication session via the second communication path by sending messages to the called device via the second network including the telephonic communication session identifier.

17. The computer readable storage media of claim 15, further comprising instructions operable to:

store in a memory information identifying the second telephonic communication session;

receive, via the network interface from the public switched telephone network, messages for the second telephonic communication session;

identify the messages received from the public switched telephone network as part of the second telephonic communication session based on the information stored in the memory; and forward, via the network interface, the messages as part of the second telephonic communication session through the Internet Protocol network, wherein the information identifying the second telephonic communication session is included in the messages that are forwarded.

18. The computer readable storage media of claim 15, wherein the first telephonic communication session comprises a first telephone call and the second communication session comprises a second telephone call; and wherein the first telephone call and the second telephone call share a common session identifier.

19. The computer readable storage media of claim 15, wherein second telephonic communication session comprises a telephone call between a first network connected device within the Internet Protocol network and a second network connected device within the Internet Protocol network, and wherein the first network connected device and the second network connected device are not the initiating device or the called device.

20. The computer readable storage media of claim 15, wherein the second telephonic communication session comprises a telephone call between the initiating device and the called device, and wherein data transmitted via the telephone call is not rendered or displayed by the initiating device or the called device.

* * * * *